(No Model.) 2 Sheets—Sheet 1.
S. W. HALL.
EARTH SCOOPER.
No. 403,661. Patented May 21, 1889.
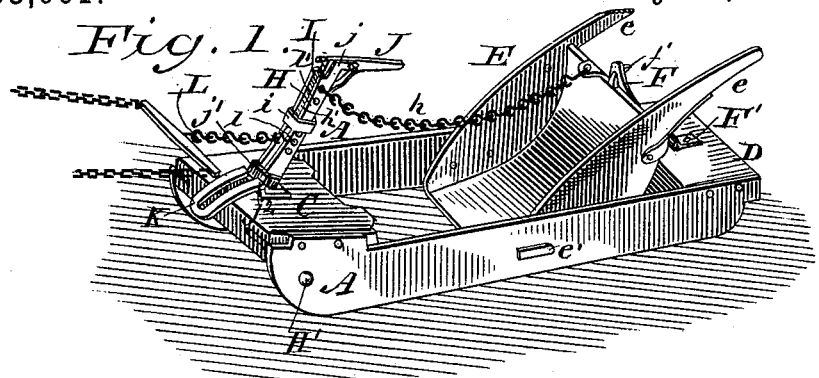
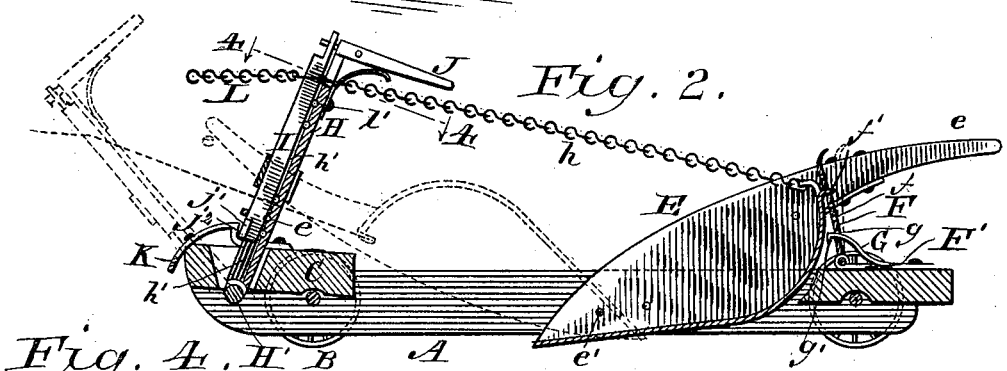
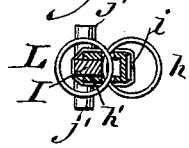
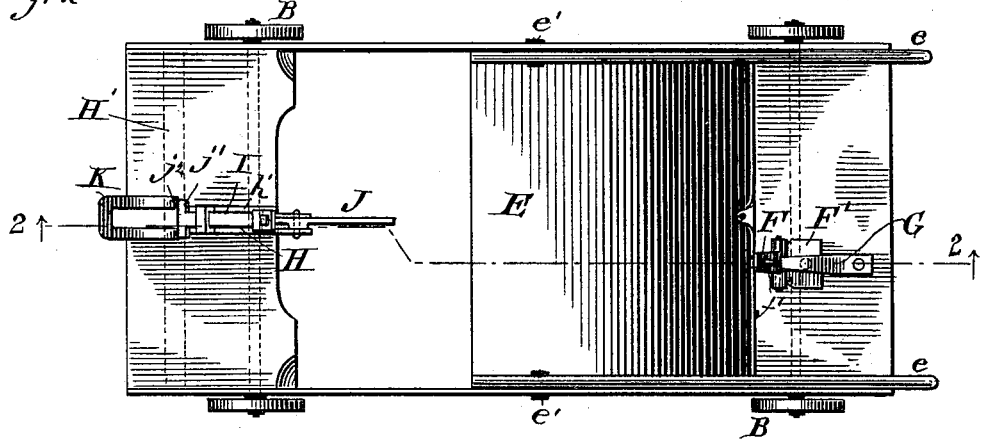
WITNESSES
H. C. Newman.
E. S. Newman.
INVENTOR,
S. W. Hall,
By his Attorneys
Baldwin, Davidson & Wight (No Model.) 2 Sheets—Sheet 2.
S. W. HALL.
EARTH SCOOPER.

No. 403,661. Patented May 21, 1889.

UNITED STATES PATENT OFFICE.

SYLVESTER W. HALL, OF ELMIRA, NEW YORK.

EARTH-SCOOPER.

SPECIFICATION forming part of Letters Patent No. 403,661, dated May 21, 1889.

Application filed October 4, 1888. Serial No. 287,237. (No model.)

*To all whom it may concern:*

Be it known that I, SYLVESTER W. HALL, a citizen of the United States, residing at Elmira, Chemung county, New York, have invented a new and useful Earth-Scooper, of which the following is a specification.

The object of my invention is to provide a strong, durable, and effective machine for gathering up and carrying away earth, particularly applicable to forming ditches, dredging harbors, and leveling land.

My invention consists, first, in providing a scoop with runners which rest on the ground and to which the scoop is attached; second, in attaching the scoop to the runners by a pivotal connection, by which the scoop is held at a constant position relatively to the ground and may be set at any desired angle; third, in pivoting the scoop to the runners and in providing means for setting the scoop to any desired depth of cut; fourth, in applying the draft of the team to overturn the scoop by suitable connections between the team and the rear end of the scoop, either directly or through intermediate devices.

My invention also consists in certain details of construction and organizations of instrumentalities hereinafter set forth.

Figure 5:
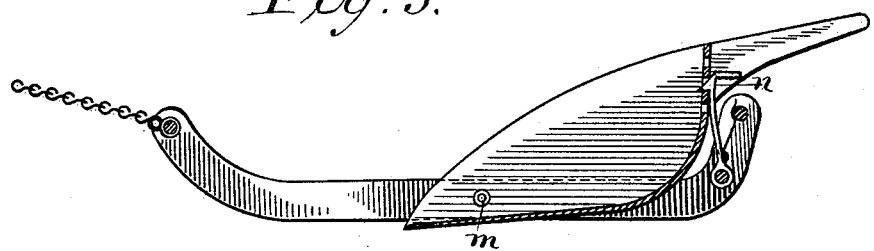
Figure 6:
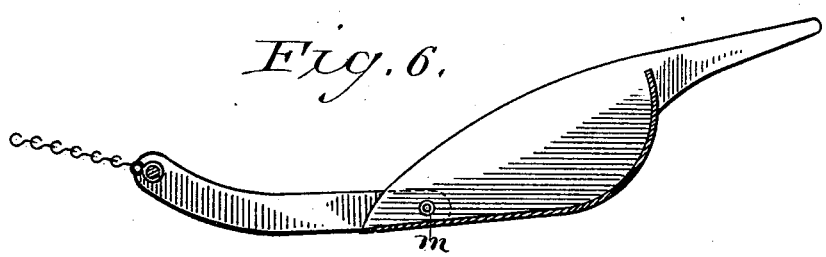

In the accompanying drawings, Figure 1 is a perspective view of my earth-scooper. Fig. 2 is a vertical central section of a modified form of my machine on the line 2 2 of Fig. 3. Fig. 3 is a plan view of the machine shown in Fig. 2, the chains being omitted. Fig. 4 is a detail view, on an enlarged scale, of the draft-connections, being a section on the line 4 4 of Fig. 2. Fig. 5 shows a modified form of the runners. Fig. 6 is a further modification, and Fig. 7 a modified way of connecting the rear end of the scoop to the team or draft-animal.

In Figs. 1 to 4, inclusive, the frame is shown as composed of sides A, which may be in the form of runners, as shown in Fig. 1, and constructed of steel, or they may be provided with wheels B, as shown in Fig. 2. The sides are connected at front and rear by cross-pieces C and D, which I term, respectively, the "front" and "rear" platforms.

The scoop or shovel E is preferably of the form shown in the drawings, and is provided with handles $e$. The scoop at its lower front end is pivoted, by means of pins or bolts $e'$ on each side, to the sides or runners A. On the rear platform is an upright arm, F, hinged at its lower end to a bed-plate, F', and provided at its upper end with a series of holes or perforations, $f$, which fit over a backwardly-extending finger, $f'$, on the upper rear edge of the scoop.

The inclination of the scoop and the distance it projects below the sides or runners may be varied by changing the finger from one hole to another. In rear of the upright arm F is a bracket, G, having a forwardly-projecting upper end that extends through a hole, $g$, in the lower part of the hinged arm F. This bracket serves to guide the arm F and prevent lateral movement. It may be provided with a nose, $g'$, to limit the forward movement of the arm.

On the front platform, C, is mounted a rocking bar, H, to which the draft is applied and which is connected to the shovel or scoop by means of a chain or other connection, $h$. The rock-bar extends through a slotted opening in the front of the platform C, and at its lower end is secured to a transverse rod, H', which has its bearings in the sides A. The bar H is provided with a longitudinal groove or guideway, $h'$, for a locking device or detent, I, which is confined within said guideway by a loop or strap, $i$. The detent is provided at its upper end with an operating-lever, J, pivoted to an arm, $j$, projecting rearwardly from the top of the arm H. At its lower end the detent is formed with laterally-projecting lugs $j'$, that engage with the upwardly-projecting portions $j^2$ of the slotted guide-plate K. The guide-plate K is secured to the front platform, as shown, and is slotted to allow the bar H to rock back and forth. The front end of the slot is closed and limits the forward movement of the bar.

The draft is applied to the bar H by means of a chain, L, which may be secured in any one of a series of holes, $l$. The chain $h$ may also be adjustably secured to the bar H by means of a series of holes, $l'$.

The bar H and its connections are what I term the "scoop-tilter."

So far as part of my invention is concerned the rock-bar may be omitted and the draft-chain attached directly to the scoop. In Fig.

2 the chains L and *h* are shown connected to illustrate this modification.

In Fig. 1 the machine is shown as arranged to scoop up the earth, the rear end of the scoop or shovel being secured to the upright arm F, the chain *h* being slack and the detent locked.

When the shovel is filled, the arm F is withdrawn and the detent unlocked, so that the rock-bar H will be moved forward to the position shown by dotted lines in Fig. 2, thereby turning the shovel over, as indicated in dotted lines, to empty the load. When the load is emptied, the shovel and the rock-bar may be easily returned to their original position.

In Fig. 5 I have shown a much simpler arrangement. Here the runners project only a short distance in front of the scoop, to which they are pivoted at *m*, and extend rearwardly and upwardly behind the scoop, where they are provided with devices *n* for rigidly holding the scoop at any inclination to which it is set. The draft is applied to the front ends of the runners. In Fig. 6 the runners terminate a short distance behind the pivots *m*. These figures of the drawings serve to illustrate in its simplest form one of the controlling features of my invention—viz., the runners or side bearings which by means of the pivots hold the scoop to a constant position relatively to the ground, and also afford a fulcrum by which the depth of the cut is readily and positively varied.

Figure 7:
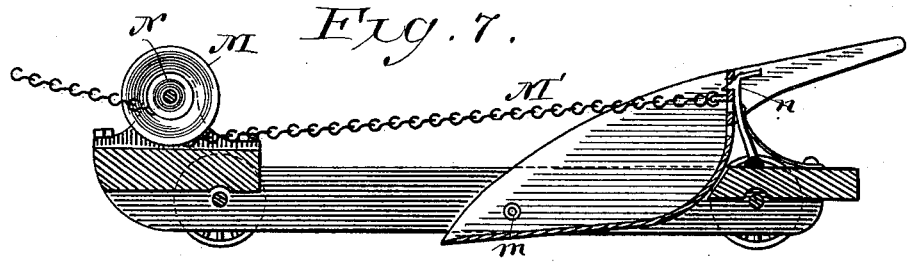

In Fig. 7 I have shown a modified way of overturning the scoop. In this instance the scoop-tilter consists of a large pulley, M, mounted in bearings on the front platform and connected to the scoop by a chain, M'. A small pulley, N, mounted on the same shaft with the pulley M, is connected to the team.

By my machine the earth may be expeditiously scooped up and transported. The side pieces confine the earth in the shovel and serve as a gage to regulate the depth of cut and as bearings for the pivots on which the scoop is hung. The side pieces or runners furnish positive constant and rigid bearings or supports for the scoop and confine the cutting-edge of the scoop to a fixed uniform depth of cut which is always constant to the ground under the runners.

The several parts are all put together so as to insure strength and durability and effectiveness in operation.

I would state, in conclusion, that the details of construction may be varied widely without departing from my invention. The machine shown is, however, simple and efficient. The principal features are:

First. The gages or side bearings, which, by means of the pivots, hold the scoop to a constant position relatively to the ground, and also afford a fulcrum by which the feed or cut of the scoop is readily and positively varied by hand or fixed by rigid attachments at the rear of the scoop. Any kind of gages which rest on the ground and to which the scoop is pivoted may thus be employed.

Second. Means for making the scoop self-holding and set to any desired depth of cut by adjusting it to any desired angle.

Third. The way of overturning the scoop by connecting the rear end thereof to the team or draft-animal. This may be done either directly or through intermediate devices.

I make no claim to the runners or face-boards or scrapers used in that class of scrapers which push the material on the surface instead of excavating it from below the surface, known as "ice-scrapers," and in which any downward pressure or dip of the point of the scraper is met and resisted by the ice or hard surface and in which no gage action is required or possible, but only to scrapers constructed for excavating material in which the scraper tends to dip or run under the surface of the ground and to side pieces or gage-bearings fitted to resist and regulate that tendency, as hereinafter distinctly claimed.

Having thus described my invention, what I claim as new, and desire to secure by Letters Patent of the United States, is—

1. The combination, substantially as hereinbefore set forth, of the gage-runners and the scoop pivoted near its point and behind its cutting-edge to the gage-runners near their lower edge, about midway of their bearing-surface.

2. The combination, substantially as hereinbefore set forth, of the gage-runners, the scoop pivoted near its point and behind its cutting-edge to the gage-runners, and the draft-connections attached to the gage-runners at their forward end.

3. The combination, substantially as hereinbefore set forth, of the scoop, the side runners to which the scoop is pivoted, the front and rear platforms connecting the runners, the upwardly-extending hinged arm on the front platform, and a flexible connection between said arm and the rear end of the scoop.

4. The combination, substantially as hereinbefore set forth, of the scoop, the sides to which the scoop is pivoted, the front and rear platforms, the rock-bar mounted on the front platform, the detent for locking said rock-bar, and connections between the rock-bar and the scoop.

5. The combination, substantially as hereinbefore set forth, of the scoop, the side bars to which the scoop is pivoted and below which it extends, the handles for moving the scoop, the front and rear platforms, the upwardly-extending arm on the rear platform, devices for adjustably securing the scoop to said arms, and draft-connections between the team and the scoop for overturning it.

6. The combination, substantially as hereinbefore set forth, of the scoop, the side bars, the front and rear platforms, the rock-bar mounted on the front platform and hinged to the side bars, a locking bar or detent working in a groove or recess in the rock-bar, and a guide-plate in which said bar works and with which the detent engages.

7. The combination, substantially as hereinbefore set forth, of the scoop, the side pieces to which the sides of the scoop are pivoted near their lower ends, and the flexible draft-connections secured to the rear end of the scoop for actuating it.

8. The combination, substantially as hereinbefore set forth, of the scoop, the side pieces to which the scoop is pivoted, the scoop-tilter, connections between the rear end of the scoop and the tilter, and draft-connections between the scoop-tilter and the team.

In testimony whereof I have hereunto subscribed my name.

SYLVESTER W. HALL.

Witnesses:
FREDERIC BARKER,
SAML. T. REYNOLDS.